(12) United States Patent
Shimatani

(10) Patent No.: US 8,699,104 B2
(45) Date of Patent: Apr. 15, 2014

(54) IMAGE SCANNER, IMAGE FORMING APPARATUS AND DEW-CONDENSATION DETERMINATION METHOD

(75) Inventor: Akira Shimatani, Osaka (JP)

(73) Assignee: Kyocera Document Solutions Inc. (JP)

( * ) Notice: Subject to any disclaimer, the term of this patent is extended or adjusted under 35 U.S.C. 154(b) by 135 days.

(21) Appl. No.: 13/483,689

(22) Filed: May 30, 2012

(65) Prior Publication Data

US 2013/0003147 A1 Jan. 3, 2013

(30) Foreign Application Priority Data

Jun. 30, 2011 (JP) .................. 2011-145703

(51) Int. Cl.
*H04N 1/04* (2006.01)
*G03F 3/08* (2006.01)

(52) U.S. Cl.
USPC ............ 358/505; 358/519; 358/521; 358/474

(58) Field of Classification Search
None
See application file for complete search history.

(56) References Cited

FOREIGN PATENT DOCUMENTS

| JP | 1-149162 | 10/1989 |
|----|----------|---------|
| JP | 10-290364 | * 10/1998 |
| JP | 11-127304 | 5/1999 |

OTHER PUBLICATIONS

Machine translation in english of JP10-290364 to Tsukasaki Hiroyasu.*

* cited by examiner

*Primary Examiner* — Benny Q Tieu
*Assistant Examiner* — Haris Sabah
(74) *Attorney, Agent, or Firm* — Gerald E. Hespos; Michael J. Porco; Matthew T. Hespos

(57) ABSTRACT

The present disclosure relates to an image scanner and an image forming apparatus equipped with the image scanner, and more particularly to a technique of detecting that dew condensation occurs on a transparent member for placing a document thereon.

19 Claims, 8 Drawing Sheets

IMAGE SCANNER, IMAGE FORMING APPARATUS AND DEW-CONDENSATION DETERMINATION METHOD

This application is based on Japanese Patent Application Serial No. 2011-145703 filed in Japan Patent Office on Jun. 30, 2011, the contents of which are hereby incorporated by reference.

BACKGROUND

The present disclosure relates to an image scanner and an image forming apparatus equipped with the image scanner, and more particularly to a technique of detecting that dew condensation occurs on a transparent member for placing a document thereon.

Heretofore, an image scanner has been configured to irradiate a document placed on a plate-shaped transparent member, with light from a light source, such as a fluorescent lamp or an LED, through the transparent member, and photoelectrically convert reflected light from the document by a photoelectric conversion element, thereby generating document image data as a scanned image of the document. One example of a prior art document (hereinafter referred to as "prior art document 1") discloses a technique of acquiring temporally-adjacent first and second shading data for shading correction, and, when a difference between the acquired two shading data is equal to or greater than a predetermined value, determining that dew-condensation occurs. Another example of the prior art document (hereinafter referred to as "prior art document 2") discloses a technique of pre-storing, as a reference light value, an amount of reflected light from a standard white plate in a state free from the occurrence of dew condensation, and comparing an amount of actual reflected light from the standard white plate with the reference light value to determine whether or not dew condensation occurs.

However, in the technique disclosed in the prior art document 1, a dew condensation state during acquisition of the temporally-preceding first shading data is unknown, so that determination on the occurrence of dew condensation is likely to be erroneously made. Moreover, there is a problem that, in a process for the determination on the occurrence of dew condensation, a waiting time arises for a period of time after the acquisition of the first shading data through until the acquisition of the second shading data.

On the other hand, in the technique disclosed in the prior art document 2, an amount of reflected light from the standard white plate in the state free from the occurrence of dew condensation is pre-stored as a reference light value, so that determination on the occurrence of dew condensation is likely to be erroneously made due to a reduction in amount of reflected light from the standard white plate resulting from a reduction in amount of light from a light source caused by aging thereof, although no waiting time is required for the determination on the occurrence of dew condensation.

In view of the above circumstances, it is an object of the present disclosure to provide an image scanner and an image forming apparatus capable of determining the occurrence of dew condensation quickly and accurately even if a light source undergoes aging.

SUMMARY

An image scanner of the present disclosure comprises: a plate-shaped transparent member (221) for placing a document thereon; a light source (222) for irradiating a document with light through the transparent member; an image scanning section (229) having a plurality of pixel detecting elements for scanning an image of the document irradiated with light from the light source, in the form of a plurality of pixels each having brightness represented by a pixel value; a first dew-condensation determination member (11) and a second dew-condensation determination member (12) provided on a part of the transparent member in adjacent relation to each other in one of a main scanning direction and an auxiliary scanning direction, wherein the first and second dew-condensation determination members (11, 12) are different from each other in terms of light reflectance; a first dew-condensation determination data acquisition section (13); a second dew-condensation determination data acquisition section (14), an inter-adjacent pixel difference value calculation section (15); an inter-distant pixel difference value calculation section (16); and a dew-condensation determination section (17).

The first dew-condensation determination data acquisition section (13) is operable to perform a first dew-condensation determination data acquisition processing for acquiring a first adjacent pixel value (Vfn) and a first distant pixel value (Vff), in such a manner that it causes the image scanning section (229) to scan the first dew-condensation determination member (11) at a position adjacent to a boundary line (BL) between the first dew-condensation determination member (11) and the second dew-condensation determination member (12) to obtain a pixel as a first adjacent pixel (fn) and acquire a pixel value of the first adjacent pixel (fn) as the first adjacent pixel value (Vfn), and further causes the image scanning section (229) to scan the first dew-condensation determination member (11) at a position distant from the boundary line (BL) with respect to the first adjacent pixel (fn) to obtain a pixel as a first distant pixel (ff) and acquire a pixel value of the first distant pixel (ff) as the first distant pixel value (Vff).

The second dew-condensation determination data acquisition section (14) is operable to perform a second dew-condensation determination data acquisition processing for acquiring a second adjacent pixel value (Vsn) and a second distant pixel value (Vsf), in such a manner that it causes the image scanning section (229) to scan the second dew-condensation determination member (12) at a position adjacent to the boundary line (BL) to obtain a pixel as a second adjacent pixel (sn) and acquire a pixel value of the second adjacent pixel (sn) as the second adjacent pixel value (Vsn), and further causes the image scanning section (229) to scan the second dew-condensation determination member (12) at a position distant from the boundary line (BL) with respect to the second adjacent pixel (sn) to obtain a pixel as a second distant pixel (sf) and acquire a pixel value of the second distant pixel (sf) as the second distant pixel value (Vsf).

The inter-adjacent pixel difference value calculation section (15) is operable to calculate a difference between the first adjacent pixel value (Vfn) and the second adjacent pixel value (Vsn), as an inter-adjacent pixel difference value (Dn), and the inter-distant pixel difference value calculation section (16) is operable to calculate a difference between the first distant pixel value (Vff) and the second distant pixel value (Vsf), as an inter-distant pixel difference value (Df). The dew-condensation determination section (17) is operable, when evaluation information indicative of a level of a difference between the inter-adjacent pixel difference value (Dn) and the inter-distant pixel difference value (Df) shows that the difference between the inter-adjacent pixel difference value and the inter-distant pixel difference value is greater than a predetermined difference level, to determine that dew condensation occurs around the boundary line (BL) on the transparent member (221).

An image forming apparatus of the present disclosure comprises the above image scanner, and an image forming section for performing image forming using data scanned by the image scanning section.

DETAILED DESCRIPTION

First Embodiment

With reference to the drawings, embodiments of an image scanner and an image forming apparatus of the present disclosure will now be described. The following embodiment will be described based on an example where the present invention is incorporated in a complex machine having functions of a copier, a facsimile machine, a printer, etc., as one embodiment of the image forming apparatus of the present disclosure.

Figure 1:
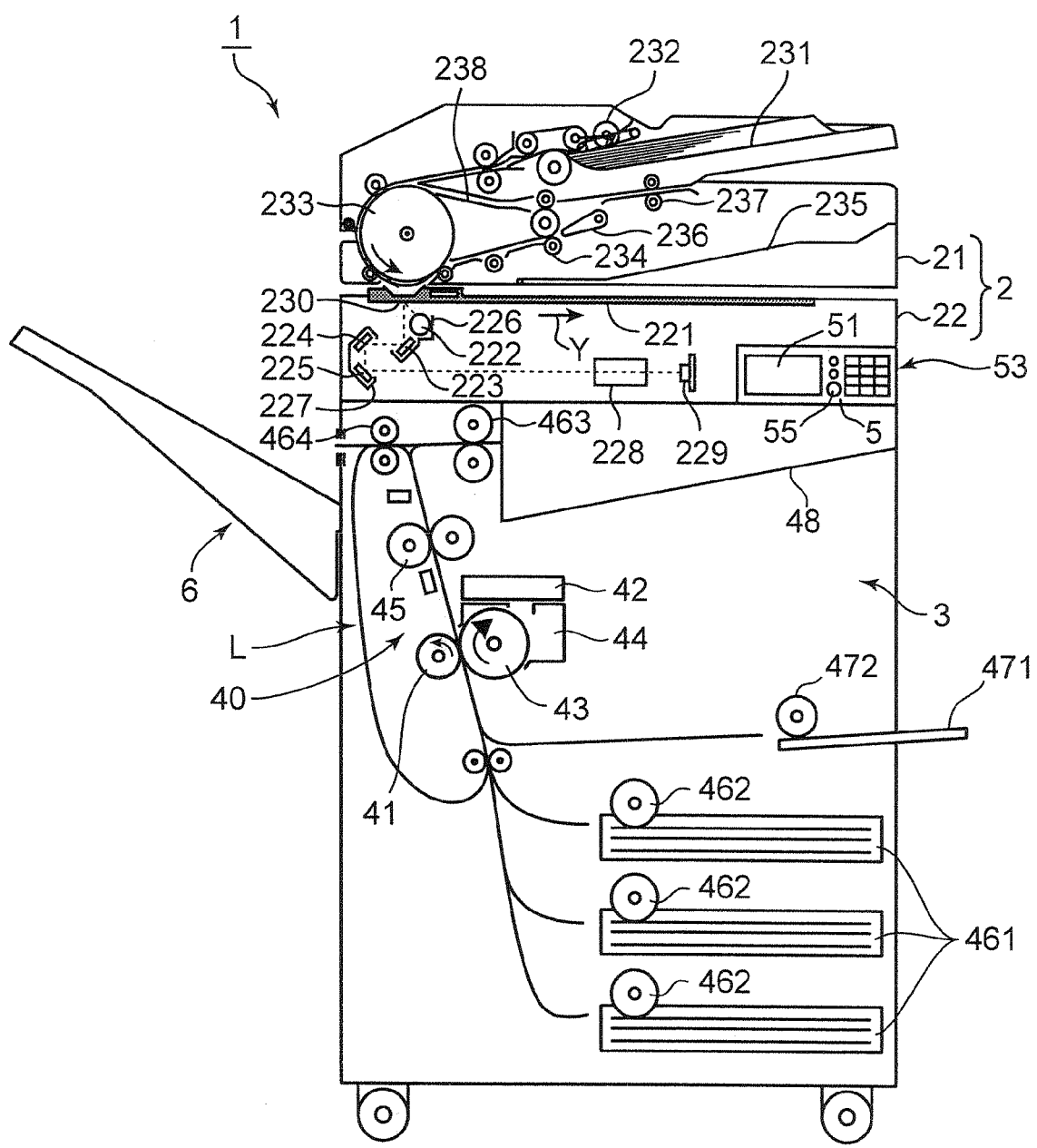
FIG. 1 is a vertical sectional view illustrating one example of a configuration of a complex machine as one example of an image forming apparatus of the present disclosure.

FIG. 1 is a vertical sectional view schematically illustrating an internal configuration of a complex machine 1 according to the first embodiment. The complex machine 1 illustrated in FIG. 1 comprises an image scanner 2 and a machine body 3.

The image scanner 2 comprises a document feed section 21 and a scanner section 22.

The document feed section 21 is designed to achieve an ADF (Automatic Document Feeder), wherein it comprises a document tray 231, a sheet feed roller 232, a conveyance drum 233, a sheet ejection roller 234, and a catch tray 235.

The document tray 231 is an area for placing one or more documents (document sheets) thereon. The documents placed on the document tray 231 are fed into a document conveyance path one-by-one by the sheet feed roller 232, and conveyed to the conveyance drum 233. The document passing through the conveyance drum 233 is ejected into the catch tray 235 through the sheet ejection roller 234.

The scanner section 22 is designed to optically scan an image of a document to generate image data. The scanner section 22 comprises a contact glass 221, a light source 222, a first mirror 223, a second mirror 224, a third mirror 225, a first carriage 226, a second carriage 227, an imaging lens 228, a CCD (Charge Coupled Device) 229 which is a line sensor.

The contact glass 221 serves as one example of a transparent member in the present disclosure, and provides a surface for placing the document thereon. The light source 222 and the first mirror 223 are supported by the first carriage 226, and the second mirror 224 and the third mirror 225 are supported by the second carriage 227. For example, a white fluorescent lamp such as a white LED is used as the light source 222. When light is emitted from the light source 222 toward the document through the contact glass 221, light reflected from the document is led to the CCD 229 via the first mirror 223, the second mirror 224, the third mirror 225, the first carriage 226, the second carriage 227 and the imaging lens 228.

The CCD 229 serves as one example of an image scanning section in the present disclosure, and is a so-called one-dimensional image sensor. The CCD 229 has a light-receiving surface composed of a plurality of light-receiving elements (one example of a plurality of pixel detecting elements in the present disclosure), wherein it is operable, when reflected light during scanning of a document by one line in a main scanning direction is focused on the light-receiving surface, to photoelectrically convert the reflected light and output image data of one line in the main scanning direction. In other words, image data of one line in the main scanning direction consists of a plurality of values (pixel values) indicative of respective brightnesses of the reflected light corresponding to the plurality of light-receiving elements (pixel detecting elements).

A document scanning mode of the image scanner 2 includes a flatbed scanning mode in which a document is scanned in a situation where it is placed on the contact glass 221, and an ADF scanning mode in which a document is fed into a document conveyance path of an ADF and scanned during conveyance thereof.

In the flatbed scanning mode, the light source 222 irradiates the document with light through the contact glass 221, and reflected light during scanning of one line in the main scanning direction equal to an arrangement direction of an array of pixels of the CCD 229 as a one-dimensional image sensor enters the imaging lens 228 after being reflected by the first mirror 223, the second mirror 224 and the third mirror 225 in this order. The light entering the imaging lens 228 provides an image on the light-receiving surface of the CCD 229.

Figure 3:
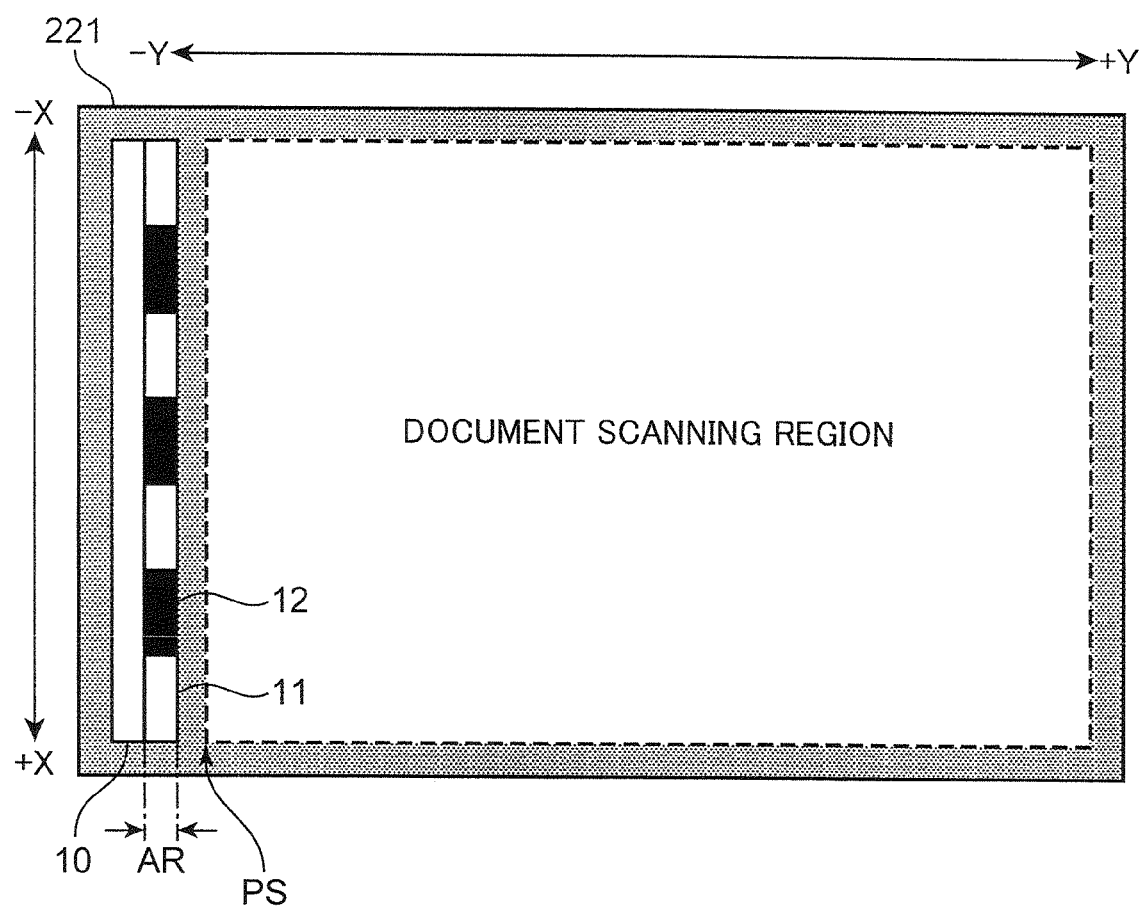
FIG. 3 is a plan view illustrating one example of an arrangement of a first dew-condensation determination member and a second dew-condensation determination member.

This operation will be performed in increments of one line along with a movement of the first carriage 226 and the second carriage 227 in a direction orthogonal to the main scanning direction (an auxiliary scanning direction; the arrow Y direction in FIG. 3). The CCD 229 is operable to simultaneously subject the entire document image data of one line in the main scanning direction to image processing, and output the processed image data to an aftermentioned A/D conversion section 216 (see FIG. 4) in units of one line.

In the ADF scanning mode, the documents placed on the document tray 231 are fed into the document conveyance path one-by-one by the sheet feed roller 232. Then, when the document passes through and just above an image scanning position PS provided in a conveyance path extending from the conveyance drum 233 to the catch tray 235, the light source 222 irradiates the document with light. Thus, reflected light during scanning of one line in the main scanning direction enters the imaging lens 228 after being reflected by the first mirror 223, the second mirror 224 and the third mirror 225 in this order. The light entering the imaging lens 228 provides an image on the light-receiving surface of the CCD 229.

This operation will be performed in increments of one line along with feeding of the document by the conveyance drum 233. The CCD 229 is operable to simultaneously process the entire document image data of one line in the main scanning direction, and output the processed image data to the after-mentioned A/D conversion section 216 (see FIG. 4) in units of one line.

The document feed section 21 further comprises a document reversing mechanism composed of a change-over guide 236, a reversing roller 237 and a reversed-document conveyance path 238.

During a one-side scanning mode and after completion of scanning of a back face of the document during a both-side scanning mode, the change-over guide 236 is shifted to an upper position to allow the document passing through the conveyance drum 233 to be ejected into the catch tray 235 through the sheet ejection roller 234. Further, after completion of scanning of a front face of the document during the both-side scanning mode, the change-over guide 236 is shifted to a lower position to allow the document passing through the conveyance drum 233 to be conveyed to a nip zone of the reversing roller 237. Subsequently, the change-over guide 236 is shifted to the upper position, and the reversing roller 237 is rotated in the opposite direction to allow the document to be re-conveyed to the conveyance drum 233 via the reversed-document conveyance path 238.

In other words, the document whose front face has been scanned through the first scanning is reversed and re-conveyed using the document reversing mechanism composed of the change-over guide 236, the reversing roller 237 and the reversed-document conveyance path 238, so that it becomes possible to additionally scan the back face by the CCD 229.

The machine body 3 comprises: a plurality of sheet cassettes 461 each for housing a plurality of sheets (recording media); a recording section 40 for forming an image on a sheet conveyed from one of the sheet cassettes 461; a plurality of sheet feed rollers 462 for feeding the sheets from respective ones of the sheet cassettes 461 one-by-one and conveying each of the sheets to the recording section 40; a stack tray 6 provided on a left side of the machine body 3; and conveyance rollers 463, 464 for conveying the sheet passing through the recording section 40 to the stack tray 6 or a catch tray 48.

The machine body 3 further comprises a manual feed tray 471. The manual feed tray 471 can be used for placing thereon any recording medium, such as a sheet having a size different from those of the sheets housed in the sheet cassettes, a sheet having one face formed with an image (backing sheet), or an OHP sheet. The recording media placed on manual feed tray 471 are fed into the machine body 3 one-by-one by a sheet feed roller 472.

The recording section 40 serves as one example of an image forming section in the present disclosure, and comprises: an exposure device 42 for outputting laser light in accordance with image data generated by the scanner section 22 to subject a photosensitive drum 43 to light exposure and thereby form an electrostatic latent image on a surface of the photosensitive drum 43; a developing device 44 for forming a toner image on the photosensitive drum 43 in accordance with the electrostatic latent image; a transfer device 41 for transferring the toner image formed on the photosensitive drum 43, onto a sheet; and a fixing device 45 for heating the sheet having the transferred toner image to fix the toner image on the sheet.

The machine body 3 also has a manual operation section 5 provided on a front side thereof. The manual operation section 5 comprises a touch panel 51, a numeric keypad 53, and a start key 55. The touch panel 51 is adapted to display various operation screens, and various manual operation buttons for allowing a user to input various operational instructions therethrough. The numeric keypad 53 is used to input an execution condition such as the number of recording sheets to be subjected to image forming (copy number), and the start key 55 is used to input an instruction for starting to execute image forming processing by the recording section 40, etc.

Figure 2:
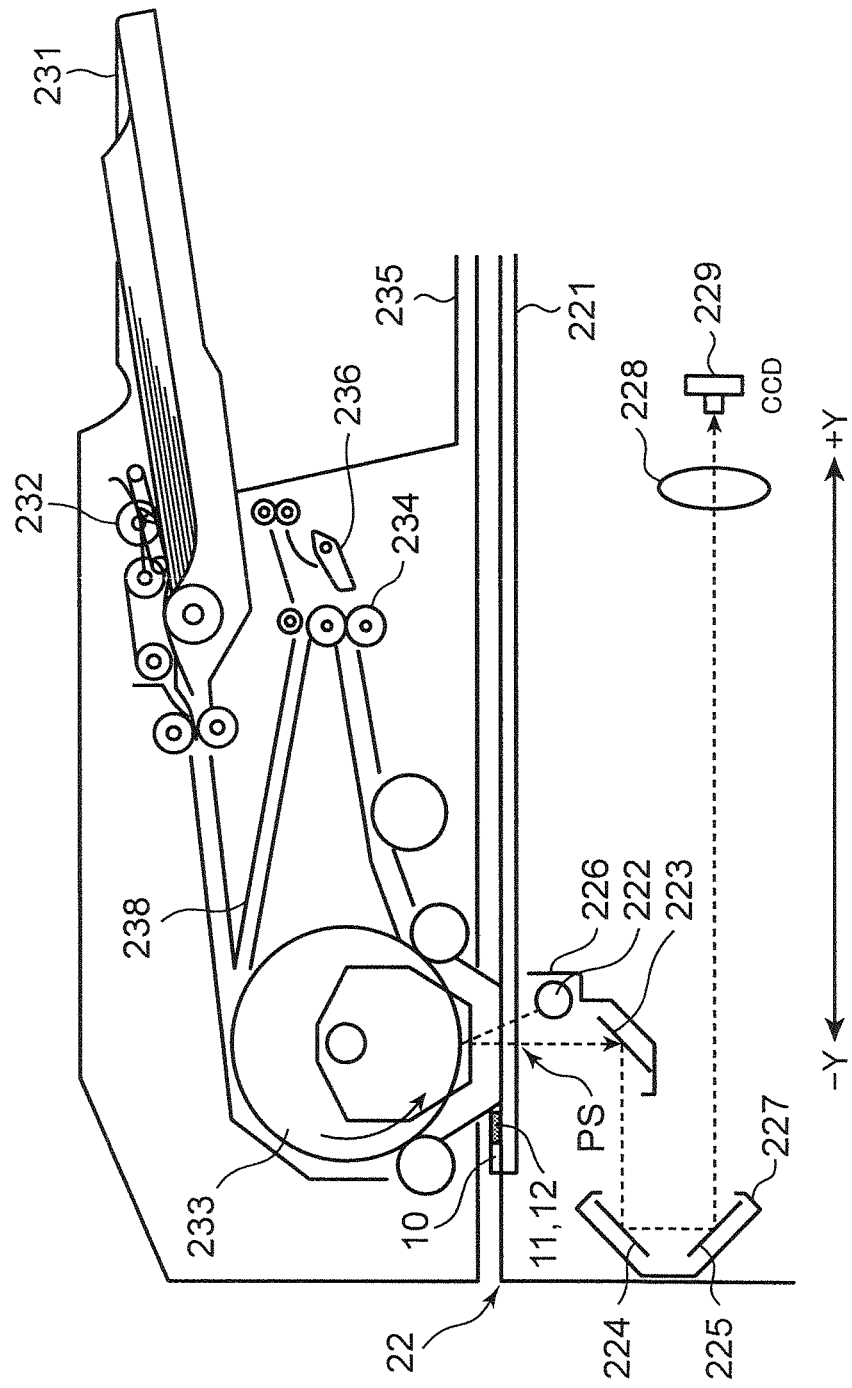
FIG. 2 is a schematic side view illustrating one example of a configuration of an image scanner of the complex machine.

As illustrated in FIGS. 2 and 3, a white reference plate 10, a white determination plate 11 serving as one example of a first dew-condensation determination member in the present disclosure, and a black determination plate 12 serving as one example of a second dew-condensation determination member, are attached to the contact glass 221, at a position outside a region for placing a target document thereon (document scanning region) indicated by the dashed-line rectangle in FIG. 3, and offset in a direction (−Y direction in the figures) opposite to a direction along which scanning of the document is progressed, i.e., opposite to a direction of movement of the first carriage 226 and the second carriage 227 (+Y direction in the figures), with respect to the image scanning position PS which is a start position of document scanning by the scanner section 22.

The white reference plate 10 is a white strip-shaped member attached to the contact glass 221 to extend in the main scanning direction (a direction orthogonal to a surface of the drawing sheet of FIG. 2; the X direction in FIG. 3).

The white determination plate 11 is a while strip-shaped member, and the black determination plate 12 is a black strip-shaped member. A plurality of the white determination plates 11 and a plurality of the black determination plates 12 are attached to the contact glass 221 in a region AR adjacent to the white reference plate 10 in the auxiliary scanning direction (Y direction in the figures), and in alternate and adjacent relation to each other in the main scanning direction (X direction in the figures).

The following description will be made on an assumption that each of the white determination plates 11 and the black determination plates 12 is formed to have the same per-plate length in the main scanning direction, and configured to be scannable by the same number of ones of the plurality of light-receiving elements provided in the CCD 229.

Figure 4:
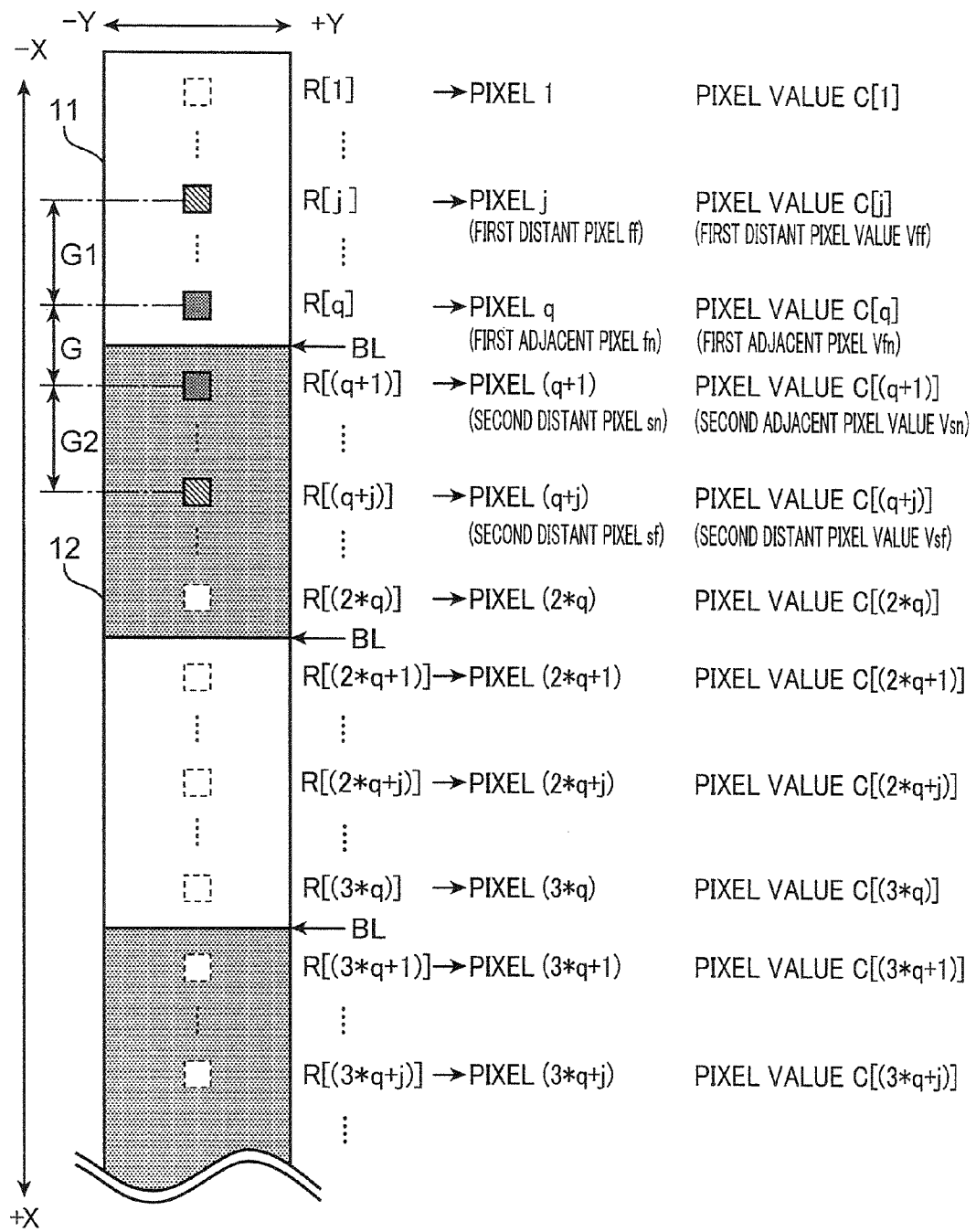
FIG. 4 is an explanatory diagram illustrating one example of a relationship of corresponding ones of a plurality of light-receiving elements for scanning the first and second dew-condensation determination members, a plurality of pixels and a plurality of pixel values.

For example, as illustrated in FIG. 4, each of the white determination plates 11 and the black determination plates 12 is scanned by q light-receiving elements. More specifically, a first one of the white determination plates 11 is scanned by q light-receiving elements R [1] to R [q], and respective pixel values C [1] to C [q] of q pixels 1 to q corresponding to the q light-receiving elements R [1] to R [q] are generated.

On the other hand, a first one of the black determination plates 12 is scanned by q light-receiving elements R [(q+1)] to R [(2*q)], and respective pixel values C [(q+1)] to C [(2*q)] of q pixels (q+1) to (2*q) corresponding to the q light-receiving elements R [(q+1)] to R [(2*q)] are generated, wherein "*" denotes a multiplication sign.

The pixel value indicates brightness of the corresponding pixel by 8 bits (0 to 255), i.e., 256 scales. For example, a pixel value of 0 indicates the lowest brightness, and a pixel value of 255 indicates the highest brightness. In the following description, a number represented by a formula in square brackets means a serial number of the light-receiving element provided in the CCD 229 (a serial number of the pixel corresponding to the light-receiving element).

The per-plate length of each of the white and black determination plates 11, 12 in the main scanning direction is not intended to be limited by the above description. The term "black" here means a color having a light reflectance of 30% or less.

Figure 5:
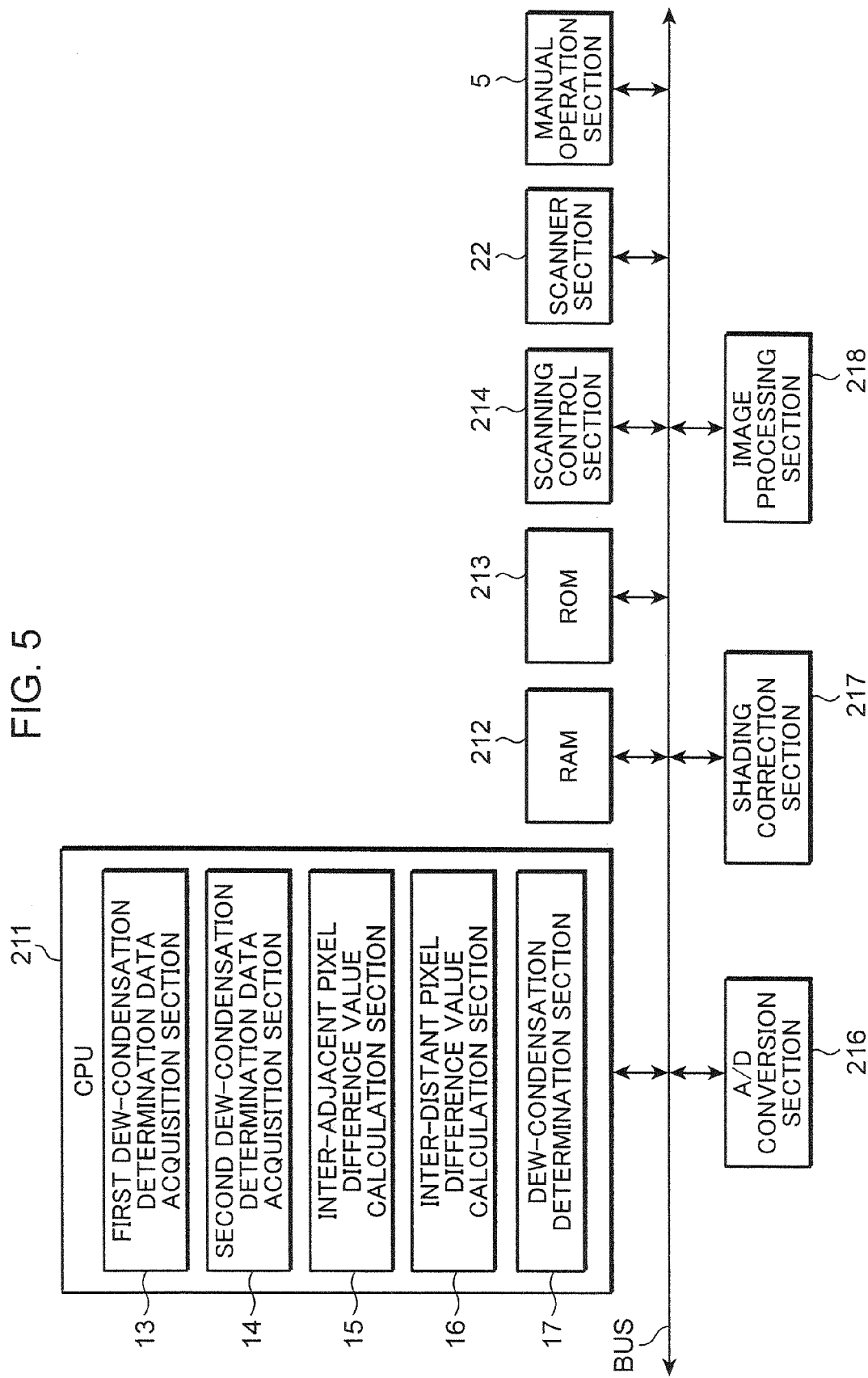
FIG. 5 is a block diagram illustrating an electrical configuration of the complex machine.

An electrical configuration of the complex machine 1 will be described below. FIG. 5 is a block diagram illustrating the electrical configuration of the complex machine 1. As illustrated in FIG. 5, the complex machine 1 comprises a CPU 211, a RAM 212, a ROM 213, a scanning control section 214, an A/D conversion section 216, a shading correction section 217, and an image processing section 218. These sections, the scanner section 22 and the manual operation section 5 are communicatably connected to each other via a data bus BUS.

The CPU 211 is designed to govern general operational control of the complex machine 1, and operable to control operation of each section of the complex machine 1 according to a program stored in the ROM 213 or a non-illustrated HDD.

In the first embodiment, the CPU 211 particularly functions as a first dew-condensation determination data acquisition section 13, a second dew-condensation determination data acquisition section 14, an inter-adjacent pixel difference value calculation section 15, an inter-distant pixel difference value calculation section 16, and a dew-condensation determination section 17.

As illustrated in FIG. 4, the first dew-condensation determination data acquisition section 13 is operable to cause one (e.g., in FIG. 4, the shaded light-receiving element R [q]) of adjacent two of the light-receiving elements located adjacent to each other with a distance G therebetween across a boundary line BL between adjacent ones of the white determination plates 11 and the black determination plates 12 to scan the white determination plate 11 to obtain a pixel (e.g., in FIG. 4, the pixel q) as a first adjacent pixel fn and acquire a pixel value (e.g., in FIG. 4, the pixel value C [q]) of the first adjacent pixel fn as a first adjacent pixel value Vfn.

As illustrated in FIG. 4, the first dew-condensation determination data acquisition section 13 is further operable to cause one (e.g., in FIG. 4, the shaded light-receiving element R [j]) of the light-receiving elements distant from the one (e.g., in FIG. 4, the shaded light-receiving element R [q]) of the two light-receiving elements located adjacent to each other with the distance G therebetween across the boundary line BL between the white and black determination plates 11, 12, toward an opposite side of the boundary line BL in the main scanning direction (X direction in FIG. 4) by a distance G1, to scan the white determination plate 11 to obtain a pixel (e.g., in FIG. 4, the pixel j) as a first distant pixel ff and acquire a pixel value (e.g., in FIG. 4, the pixel value C [j]) of the first distant pixel ff as a first distant pixel value Vff.

The processing for acquiring the first adjacent pixel value Vfn and the first distant pixel value Vff by the first dew-condensation determination data acquisition section 13 will hereinafter be referred to as "first dew-condensation determination data acquisition processing".

As illustrated in FIG. 4, the second dew-condensation determination data acquisition section 14 is operable to cause a remaining one (e.g., in FIG. 4, the shaded light-receiving element R [(q+1)]) of the two light-receiving elements located adjacent to each other with the distance G therebetween across the boundary line BL between the white and black determination plates 11, 12 to scan the black determination plate 12 to obtain a pixel (e.g., in FIG. 4, the pixel (q+1)) as a second adjacent pixel sn and acquire a pixel value (e.g., in FIG. 4, the pixel value C [(q+1)]) of the second adjacent pixel sn as a second adjacent pixel value Vsn.

As illustrated in FIG. 4, the second dew-condensation determination data acquisition section 14 is further operable to cause one (e.g., in FIG. 4, the shaded light-receiving element R [(q+j)]) of the light-receiving elements distant from the remaining one (e.g., in FIG. 4, the shaded light-receiving element R [(q+1)]) of the two light-receiving elements located adjacent to each other with the distance G therebetween across the boundary line BL between the white and black determination plates 11, 12, toward an opposite side of the boundary line BL in the main scanning direction (X direction in FIG. 4) by a distance G2, to scan the black determination plate 12 to obtain a pixel (e.g., in FIG. 4, the pixel (q+j)) as a second distant pixel sf and acquire a pixel value (e.g., in FIG. 4, the pixel value C [(q+j)]) of the second distant pixel sf as a second distant pixel value Vsf.

The processing for acquiring the second adjacent pixel value Vsn and the second distant pixel value Vsf by the second dew-condensation determination data acquisition section 14 will hereinafter be referred to as "second dew-condensation determination data acquisition processing".

The inter-adjacent pixel difference value calculation section 15 is operable to calculate a difference between the first adjacent pixel value Vfn acquired through the first dew-condensation determination data acquisition processing by the first dew-condensation determination data acquisition section 13, and the second adjacent pixel value Vsn acquired through the second dew-condensation determination data acquisition processing by the second dew-condensation determination data acquisition section 14, as an inter-adjacent pixel difference value Dn.

The inter-distant pixel difference value calculation section 16 is operable to calculate a difference between the first distant pixel value Vff acquired through the first dew-condensation determination data acquisition processing by the first dew-condensation determination data acquisition section 13, and the second distant pixel value Vsf acquired through the second dew-condensation determination data acquisition processing by the second dew-condensation determination data acquisition section 14, as an inter-distant pixel difference value Df.

The dew-condensation determination section 17 is operable, based on a result of comparison between evaluation information indicative of a level of a difference between the inter-adjacent pixel difference value Dn and the inter-distant pixel difference value Df, and a dew-condensation determination threshold value (predetermined difference level), to determine whether or not dew condensation occurs around the boundary line BL on the contact glass 221.

Details of each processing in the first dew-condensation determination data acquisition section 13, the second dew-condensation determination data acquisition section 14, the inter-adjacent pixel difference value calculation section 15, the inter-distant pixel difference value calculation section 16 and the dew-condensation determination section 17 will be described later.

The RAM 212 is a memory for use as a working area during the operational control of the complex machine 1 and the image scanner 2 by the CPU 211 according to the program. The ROM 213 is a memory for storing therein the program, various set values and others.

The scanning control section 214 is operable to perform control of causing the CCD 229 to scan an image of a document in increments of one line in the main scanning direction, while relatively moving the CCD 229 in the auxiliary scanning direction with respect to the document. Specifically, the scanning control section 214 is operable to allow the scanner section 22 to scan an image of a document by controlling an operation of irradiating a document with light from the light source 222, an operation of moving the first carriage 226 and the second carriage 227 in the auxiliary scanning direction, an operation of conveying a document in the auxiliary scanning direction by the document feed section 21, and an operation of receiving light by the CCD 229.

The A/D conversion section 216 is operable to perform an A/D conversion processing of converting document image data of one line in the main scanning direction, i.e., an analog electrical signal output from the scanner section 22, into digital image data having a predetermined bit number. The A/D conversion section 216 is operable to output the A/D converted image data to the shading correction section 217, the first dew-condensation determination data acquisition section 13, the second dew-condensation determination data acquisition section 14, etc.

The shading correction section 217 is composed, for example, of dedicated hardware, such ASIC (Application Specific Integrated Circuits) in a manner capable of performing high-speed processing, and designed to subject the document image data output through the scanner section 22 and the A/D conversion section 216 to shading correction.

For example, the shading correction section 217 is operable to calculate a difference in pixel value between each pair of corresponding pixels in white reference data obtained in such a manner that an image of the white reference plate 10 corresponding to one line in the main scanning direction is scanned by the CCD 229 in the form of a plurality of pixels, and black reference data obtained in such a manner that an analog electric signal output from the CCD 229 without light irradiation by the light source 222 is A/D-converted by the A/D conversion section 216, i.e., an image of one line in the main scanning direction is scanned in the form of a plurality of pixels without light irradiation by the light source 222. Then, the shading correction section 217 is operable to divide, by the calculated difference, a difference in pixel value between each pair of corresponding pixels in document image data obtained by scanning a document by one line in the main scanning direction, and the black reference data, and multiply the obtained result by a maximum of the pixel values.

In this manner, image data about a target document is subjected to the shading correction, so that it becomes possible to correct unevenness in distribution of irradiation light from the light source 222 and a difference in sensitivity between the pixels of the CCD 229. It is to be understood that the shading correction section 217 is not limited to the above configuration, but may be configured to perform the shading correction in any other suitable manner. Further, shading correction processing to be performed by the shading correction section 217 may be implemented as a program executable by the CPU 211.

The image processing section 218 is composed, for example, of dedicated hardware, such ASIC in a manner capable of performing high-speed processing, and designed to subject the image data output from the A/D conversion section 216 or the shading-corrected image data output from the shading correction section 217 to various image processing.

For example, the image processing section 218 is operable to subject the above image data to correction processing such as level correction or gamma correction, or image modification processing, such as image data compression or decompression processing, or image enlargement or reduction processing. It is to be understood that various image processing to be performed by the image processing section 218 may be implemented as a program executable by the CPU 211.

Now, the document scanning control by the scanning control section 214 will be described in detail. In this connection, each processing in the first dew-condensation determination data acquisition section 13, the second dew-condensation determination data acquisition section 14, the inter-adjacent pixel difference value calculation section 15, the inter-distant pixel difference value calculation section 16 and the dew-condensation determination section 17 will also be described in detail below.

Figure 6:
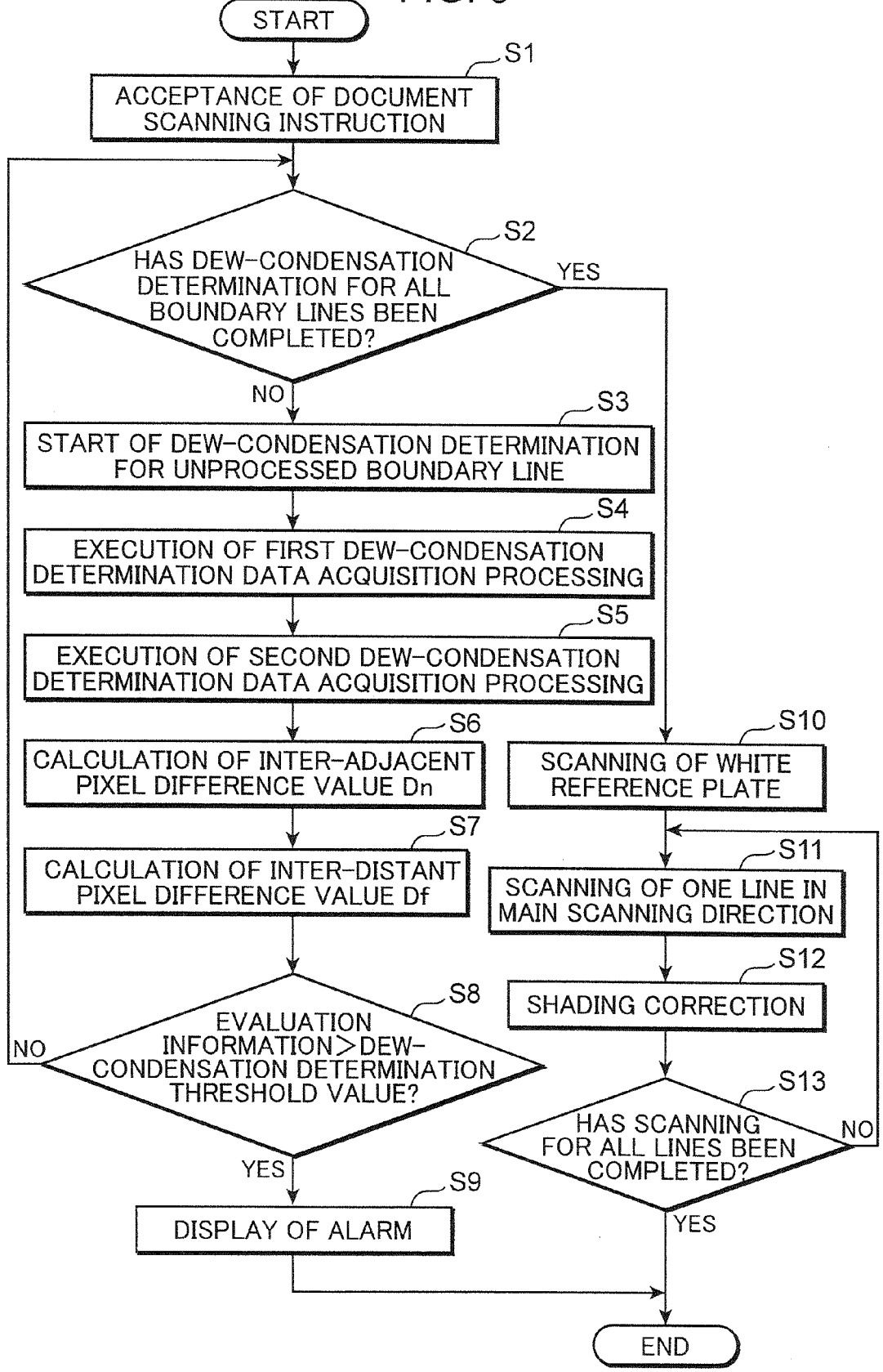
FIG. 6 is a flowchart illustrating one example of document scanning control by a scanning control section.

As illustrated in FIG. 6, when a document scanning instruction for the scanning control section 214 is input, for example, through the manual operation section 5 manually operated by a user, and accepted by the CPU 211 (S1), and aftermentioned dew-condensation determination processing for all of the boundary lines BL between respective adjacent ones of the white determination plates 11 and the black determination plates 12 is not completed (S2: NO), the scanning control section 214 starts the dew-condensation determination processing for the pending boundary line BL (S3).

Upon starting the dew-condensation determination processing for the pending boundary line (target boundary line) BL, the scanning control section 214 operates to cause the first dew-condensation determination data acquisition section 13 to perform the first dew-condensation determination data acquisition processing (S4), and cause the second dew-condensation determination data acquisition section 14 to perform the second dew-condensation determination data acquisition processing (S5).

When the first dew-condensation determination data acquisition processing is started in Step S4, the first dew-condensation determination data acquisition section 13 operates to cause one of adjacent two of the light-receiving elements located adjacent to each other with a distance therebetween across the target boundary line to scan the white determination plate 11 to obtain a pixel as the first adjacent pixel fn and acquire a pixel value of the obtained pixel as the first adjacent pixel value Vfn.

Further, the first dew-condensation determination data acquisition section 13 operates to cause one of the light-receiving elements distant from the one of the two light-receiving elements located adjacent to each other with the distance therebetween across the target boundary line BL, toward an opposite side of the target boundary line in the main scanning direction, to scan the white determination plate 11 to obtain a pixel as the first distant pixel ff and acquire a pixel value of the obtained pixel as the first distant pixel value Vff.

Specifically, as illustrated in FIG. 4, in dew-condensation determination processing for the boundary line BL between a first one of the white determination plates 11 and a first one of the black determination plates 12, the first dew-condensation determination data acquisition section 13 operates to cause one R [q] of the two light-receiving elements located adjacent to each other with the distance G therebetween across this target boundary line BL to scan the white determination plate 11 to obtain a pixel q as the first adjacent pixel fn and acquire a pixel value C [q] of the pixel q as the first adjacent pixel value Vfn.

Further, the first dew-condensation determination data acquisition section 13 operates to cause the light-receiving element R [j] distant from the one R [q] of the two light-receiving elements located adjacent to each other with the distance G therebetween across the target boundary line BL, toward the opposite side of the target boundary line BL in the main scanning direction (X direction in the figures) by the distance G1, to scan the white determination plate 11 to obtain a pixel j as the first distant pixel ff and acquire a pixel value C [j] of the pixel j as the first distant pixel value Vff.

On the other hand, in dew-condensation determination processing for the boundary line BL between the first black determination plate 12 and a second one of the white determination plates 11, the first dew-condensation determination data acquisition section 13 operates to cause the light-receiving element R [(2*q+1)] to scan the white determination plate 11 to obtain a pixel (2*q+1) as the first adjacent pixel fn and acquire a pixel value C [(2*q+1)] of the obtained pixel as the first adjacent pixel value Vfn. Further, the first dew-condensation determination data acquisition section 13 operates to cause the light-receiving element R [(2*q+j)] to scan the white determination plate 11 to obtain a pixel (2*q+j) as the first distant pixel ff and acquire a pixel value C [(2*q+j)] of the obtained pixel as the first distant pixel value Vff.

When the second dew-condensation determination data acquisition processing is started in Step S5, the second dew-condensation determination data acquisition section 14 operates to cause a remaining one of the two light-receiving elements located adjacent to each other with the distance therebetween across the target boundary line to scan the black determination plate 12 to obtain a pixel as the second adjacent pixel sn and acquire a pixel value of the obtained pixel as the second adjacent pixel value Vsn.

Further, the second dew-condensation determination data acquisition section 14 operates to cause one of the light-receiving elements distant from the remaining one of the two light-receiving elements located adjacent to each other with the distance therebetween across the target boundary line BL, toward an opposite side of the target boundary line in the main scanning direction, to scan the black determination plate 12 to obtain a pixel as the second distant pixel sf and acquire a pixel value of the obtained pixel as the second distant pixel value Vsf.

Specifically, as illustrated in FIG. 4, in the dew-condensation determination processing for the boundary line BL between the first white determination plate 11 and the first black determination plate 12, the second dew-condensation determination data acquisition section 14 operates to cause one R [(q+1)] of the two light-receiving elements located adjacent to each other with the distance G therebetween across this target boundary line BL to scan the black determination plate 12 to obtain a pixel (q+1) as the second adjacent pixel sn and acquire a pixel value C [(q+1)] of the pixel (q+1) as the second adjacent pixel value Vsn.

Further, the second dew-condensation determination data acquisition section 14 operates to cause the light-receiving element R [(q+j)] distant from the remaining one R [(q+1)] of the two light-receiving elements located adjacent to each other with the distance G therebetween across the target boundary line BL, toward the opposite side of the target boundary line BL in the main scanning direction (X direction in the figures) by the distance G2, to scan the black determination plate 12 to obtain a pixel (q+j) as the second distant pixel sf and acquire a pixel value C [(q+j)] of the pixel (q+j) as the second distant pixel value Vsf.

On the other hand, in the dew-condensation determination processing for the boundary line BL between the first black determination plate 12 and the second white determination plate 11, the second dew-condensation determination data acquisition section 14 operates to cause the light-receiving element R [(2*q)] to scan the black determination plate 12 to obtain a pixel (2*q) as the second adjacent pixel sn and acquire a pixel value C [(2*q)] of the pixel (2*q) as the second adjacent pixel value Vsn. Further, the second dew-condensation determination data acquisition section 14 operates to cause the light-receiving element R [(q+j)] to scan the black determination plate 12 to obtain a pixel (q+j) as the second distant pixel sf and acquire a pixel value C [(q+j)] of the pixel (q+j) as the second distant pixel value Vsf.

Returning to FIG. 6, the scanning control section 214 operates to cause the inter-adjacent pixel difference value calculation section 15 to calculate the inter-adjacent pixel difference value Dn, using the first adjacent pixel value Vfn acquired in Step S4 and the second adjacent pixel value Vsn acquired in Step S5 (S6).

Specifically, in Step S6, the inter-adjacent pixel difference value calculation section 15 operates to subtract the second adjacent pixel value Vsn acquired in Step S5 from the first adjacent pixel value Vfn acquired in Step S4 to obtain an absolute value of a result of the subtraction as the inter-adjacent pixel difference value Dn (Dn=|Vfn−Vsn|).

Subsequently, the scanning control section 214 operates to cause the inter-distant pixel difference value calculation section 16 to calculate the inter-distant pixel difference value Df, using the first distant pixel value Vff acquired in Step S4 and the second distant pixel value Vsf acquired in Step S5 (S7).

Specifically, in Step S7, the inter-distant pixel difference value calculation section 16 operates to subtract the second distant pixel value Vsf acquired in Step S5 from the first distant pixel value Vff acquired in Step S4 to obtain an absolute value of a result of the subtraction as the inter-distant pixel difference value Df (Df=|Vff−Vsf|).

Then, the scanning control section 214 operated to cause the dew-condensation determination section 17 to determine whether or not dew condensation occurs around the target boundary line BL subject to the dew-condensation determination processing started from Step S3, based on a result of comparison between evaluation information indicative of a level of a difference between the inter-adjacent pixel difference value Dn calculated in Step S6 and the inter-distant pixel difference value Df calculated in Step S7, and a predetermined dew-condensation determination threshold value (S8).

Specifically, in Step S8, the dew-condensation determination section 17 operates to divide the inter-distant pixel difference value Df calculated in Step S7 by the inter-adjacent pixel difference value Dn calculated in Step S6, and use a result of the division, i.e., a ratio Df/Dn, as the evaluation information indicative of the difference level between the inter-adjacent pixel difference value Dn and the inter-distant pixel difference value Df. Then, when the evaluation information is greater than the predetermined dew-condensation determination threshold value, the dew-condensation determination section 17 determines that dew condensation occurs around the target boundary line BL. The predetermined dew-condensation determination threshold value is pre-set based on an experimental value obtained, for example, by performing a test operation in a situation where dew condensation occurs on the contact glass 221, and pre-stored in the ROM 213.

The evaluation information is not intended to be limited to a result of dividing the inter-distant pixel difference value Df by the inter-adjacent pixel difference value Dn. For example, a difference value (Df−Dn) obtained by subtracting the inter-adjacent pixel difference value Dn from the inter-distant pixel difference value Df may be used as the evaluation information. Alternatively, a result of dividing the inter-adjacent pixel difference value Dn by the inter-distant pixel difference value Df, i.e., Dn/Df, may be used as the evaluation information. In this case, when the evaluation information Dn/Df is less than the predetermined dew-condensation determination threshold value, the dew-condensation determination section 17 may determine that dew condensation occurs around the target boundary line BL.

Returning to FIG. 6, when the dew-condensation determination section 17 determines that dew condensation occurs around the target boundary line BL subject to the dew-condensation determination processing started from Step S3 (S8: YES), the scanning control section 214 operates to display an alarm message indicating that dew condensation occurs around the target boundary line BL in the contact glass 221, for example, on the touch panel 51 of the manual operation section 5, without causing the scanner section 22 to scan the document (S9), and terminates the document scanning control.

On the other hand, when the dew-condensation determination section 17 determines that no dew condensation occurs around the target boundary line BL subject to the dew-condensation determination processing started from Step S3 (S8: NO), the determination processing in Step S2 will be performed again.

Then, when the dew-condensation determination processing (determination on whether or not dew condensation occurs around each target boundary line BL in the contact glass 221) for all of the boundary lines BL between respective adjacent ones of the white determination plates 11 and the black determination plates 12 is completed (S2: YES), i.e., when no dew condensation occurs around any boundary line BL, the scanning control section 214 operates to move the first carriage 226 and the second carriage 227 to the position of the white reference plate 10, and then cause the CCD 229 to scan an image of the white reference plate 10 by one line in the main scanning direction, whereafter it operates to store resulting scanned white reference data in the RAM 212 (S10).

Then, the scanning control section 214 operates to move the first and second carriages 226, 227 of the scanner section 22 to the document scanning start position PS. Then, the scanning control section 214 operates, until scanning of a document for all lines in the main scanning direction is completed, to cause the scanner section 22 to scan an image of the document in increments of one line in the main scanning direction (S11), and cause the shading correction section 217 to shading-correct the scanned document image data of one line in the main scanning direction (S12). The document image data subjected to the shading correction for all lines in the main scanning direction through Steps S10 to S13 in the above manner will be used for the image forming.

This means that the dew-condensation determination is performed before an image of a document is scanned by the scanner section 22. Thus, it becomes possible to avoid a situation where the scanner section 22 scans an image of a document in an undesirable manner when dew condensation occurs on the contact glass 221.

More specifically, one example of an image scanner in the present disclosure comprises the scanner section 22, the first dew-condensation determination data acquisition section 13, the second dew-condensation determination data acquisition section 14, the inter-adjacent pixel difference value calculation section 15, the inter-distant pixel difference value calculation section 16, and the dew-condensation determination section 17.

The evaluation information calculated in Step S8 and represented as a ratio between the inter-adjacent pixel difference value Dn and the inter-distant pixel difference value Df can indicate a difference between respective brightness differences at relatively adjacent positions and at relatively distant positions across the boundary line between the white determination plate 11 and the black determination plate 12. When the evaluation information has a large value, there is a large difference in contrast between an area adjacent to the boundary line and a peripheral area thereof, so that a scanned image of the adjacent white and black determination plates 11, 12 becomes blurred in a region around the boundary line therebetween. Thus, the evaluation information calculated in the Step S8 is considered to indicate a degree of blurring around the boundary line between the white and black determination plates 11, 12.

In other words, in the complex machine according to the first embodiment, even if an amount of reflected light from a document is reduce due to aging of the light source 222, evaluation information indicative of a difference between respective brightness differences at relatively adjacent positions and at relatively distant positions across the boundary line between the white determination plate 11 and the black determination plate 12 can be accurately calculated based, for example, on the ratio between inter-adjacent pixel difference value Dn and the inter-distant pixel difference value Df, in the same manner as that in a situation where no reduction in amount of reflected light from a document occurs. Particularly, the evaluation information can be calculated quickly without causing a waiting time. Then, blurring in a region around the boundary line between the white and black determination plates 11, 12 can be accurately determined based on a comparison result that a degree of the blurring indicated by the evaluation information is greater than a degree of blurring indicated by the dew-condensation determination threshold value.

Thus, when dew condensation occurs around the boundary line, it becomes possible to quickly and accurately determine that a region around the boundary line becomes blurred due to irregular reflection of light, thereby determining the occurrence of dew condensation around the boundary line quickly and accurately.

Second Embodiment

In the following description of a second embodiment, only a difference from the first embodiment will be described in detail, and description of the same part as the first embodiment will be omitted.

Figure 7:
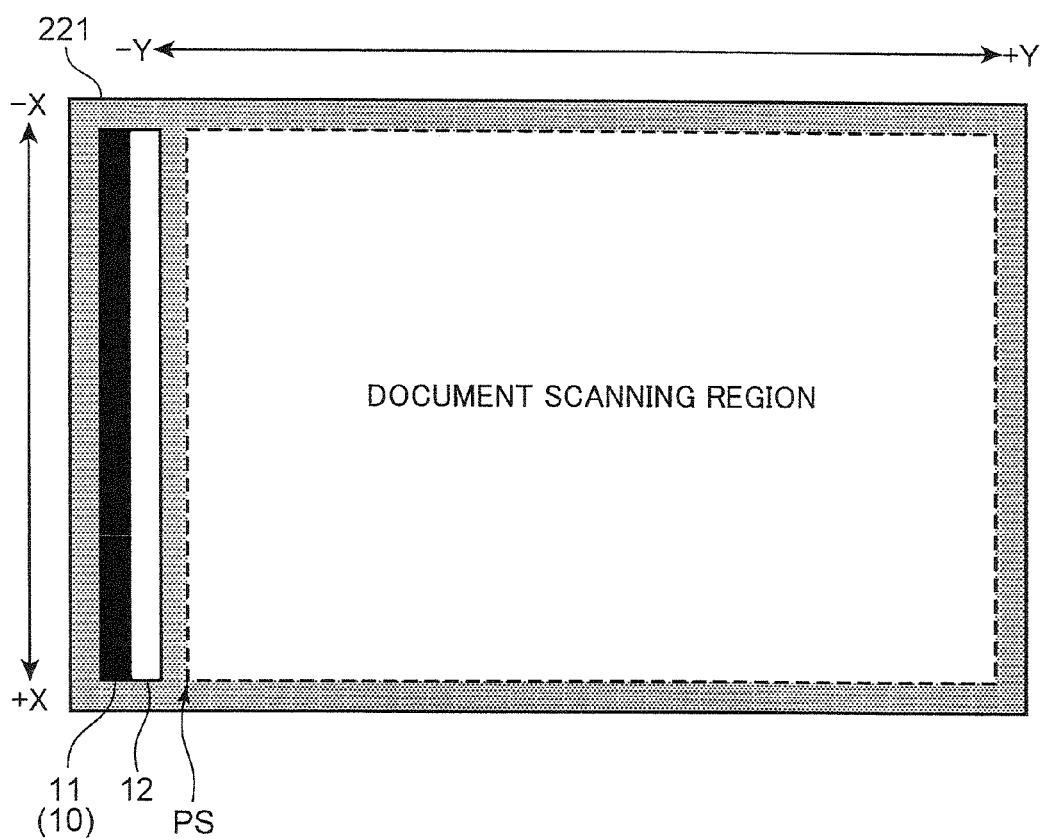
FIG. 7 is a plan view illustrating an arrangement of the first dew-condensation determination member and the second dew-condensation determination member, as an example different from that in FIG. 3.

In a complex machine according to the second embodiment, as illustrated in FIG. 7, a white determination plate 11 additionally serving as a white reference plate 10 is attached to a contact glass 221, at a position outside a region for placing a target document thereon (document scanning region) indicated by the dashed-line rectangle in FIG. 7, and offset in a direction (−Y direction in FIG. 7) opposite to a direction along which scanning of the document is progressed, i.e., opposite to a direction of movement of the first carriage 226 and the second carriage 227 (+Y direction in FIG. 7), with respect to an image scanning position PS which is a start position of document scanning by the scanner section 22. A black determination plate 12 is attached to the contact glass 221 in adjacent relation to the white determination plate 11 in the auxiliary scanning direction.

Figure 8:
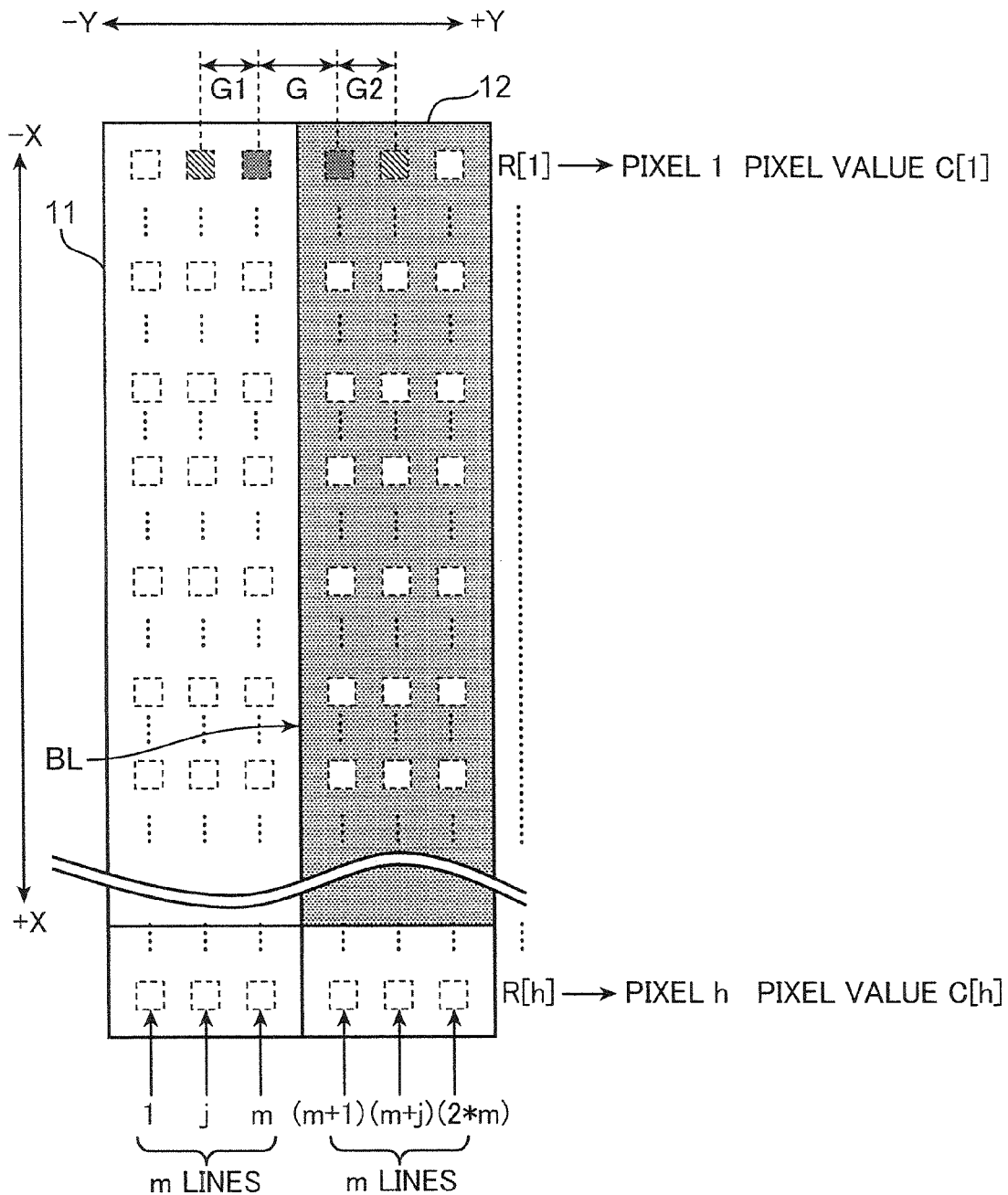
FIG. 8 is an explanatory diagram illustrating a relationship of corresponding ones of a plurality of light-receiving elements for scanning the first and second dew-condensation determination members, a plurality of pixels and a plurality of pixel values, as an example different from that in FIG. 4.

In the second embodiment, in Step S4 (FIG. 6), for example, as illustrated in FIG. 8, the first dew-condensation determination data acquisition section 13 is operable to cause a specific one (e.g., the light-receiving element R [1]) of the plurality of light-receiving elements to scan the white determination plate 11 by a plurality of lines (m lines) in the main scanning direction (X direction in FIG. 8) to obtain one (e.g., the shaded pixel (on the m-th line) scanned by the light-receiving element R [1]) of adjacent two of m pixels located adjacent to each other with a distance G therebetween across a boundary line BL between the white determination plate 11 and the black determination plate 12, as a first adjacent pixel fn, and acquire a pixel value of the first adjacent pixel fn as a first adjacent pixel value Vfn.

Further, the first dew-condensation determination data acquisition section 13 is operable to cause the specific light-receiving element (e.g., the light-receiving element R [1]) to scan the white determination plate 11 by the plurality of lines (m lines) to obtain one (e.g., the shaded pixel (on the j-th line) scanned by the light-receiving element R [1]) of the m pixels distant from the one (e.g., the pixel on the m-th line) of the two pixels located adjacent to each other with the distance G therebetween across the boundary line BL, toward an opposite side of the boundary line BL in the auxiliary scanning direction, as a first distant pixel ff, and acquire a pixel value of the first distant pixel ff as a first distant pixel value Vff.

Similarly, in Step S5 (FIG. 6), for example, as illustrated in FIG. 8, the second dew-condensation determination data acquisition section 14 is operable to cause the specific light-receiving element (e.g., the light-receiving element R [1]) to scan the black determination plate 12 by a plurality of lines (m lines from the (m+1)-th line to the (2*m)-th line) in the main scanning direction (X direction in FIG. 8) to obtain a remaining one (e.g., the shaded pixel (on the (m+1)-th line) scanned by the light-receiving element R [1]) of the two pixels located adjacent to each other with the distance G therebetween across the boundary line BL, as a second adjacent pixel sn, and acquire a pixel value of the second adjacent pixel sn as a second adjacent pixel value Vsn.

Further, as shown in FIG. 8, the second dew-condensation determination data acquisition section 14 is operable to cause the specific light-receiving element (e.g., the light-receiving element R [1]) to scan the black determination plate 12 by the plurality of lines (m lines) to obtain one (e.g., the shaded pixel (on the (m+j)-th line) scanned by the light-receiving element R [1]) of the m pixels distant from the remaining one (e.g., the pixel on the (m+1)-th line) of the two pixels located adjacent to each other with the distance G therebetween across the boundary line BL, toward an opposite side of the boundary line BL in the auxiliary scanning direction, as a second distant pixel sf, and acquire a pixel value of the second distant pixel sf as a second distant pixel value Vsf.

Then, in Step S6 (FIG. 6), the inter-adjacent pixel difference value calculation section 15 is operable to calculate an inter-adjacent pixel difference value Dn, using the first adjacent pixel value Vfn and the second adjacent pixel value Vsn acquired in Step S4 and Step S5. Further, in Step S7 (FIG. 6), the inter-distant pixel difference value calculation section 16 is operable to calculate an inter-distant pixel difference value Df, using the first distant pixel value Vff and the second distant pixel value Vsf acquired in Step S4 and Step S5.

Thus, in Step S8 (FIG. 6), the dew-condensation determination section 17 can determine whether or not dew condensation occurs around the boundary line BL extending in the main scanning direction, at a position corresponding to the specific light-receiving element (in the above specific example, the light-receiving element R [1]) in the main scanning direction, using the calculated inter-adjacent and inter-distant pixel difference values Dn, Df.

Third Embodiment

In the following description of a third embodiment, only a difference from the first or second embodiment will be described in detail, and description of the same part as the first or second embodiment will be omitted.

In a complex machine according to the third embodiment, in the case where the plurality of white determination plates 11 and the plurality of black determination plates 12 are attached to the region AR in alternate and adjacent relation to each other as illustrated in FIGS. 3 and 4, in Step S4 (FIG. 6), the first dew-condensation determination data acquisition section 13 is operable to cause one (e.g., the light-receiving element R [q]) of the two light-receiving elements adjacent to each other with a distance therebetween across the target boundary line BL to scan the white determination plate 11 by a plurality of lines in the main scanning direction, or repeatedly scan the white determination plate 11 along the same one line in the main scanning direction, to obtain a plurality of pixel values (e.g., C [q]) of a pixel (e.g., the pixel q) corresponding to the used light-receiving element and acquire an average of the plurality of obtained pixel values as a new first adjacent pixel value NVfn.

Further, the first dew-condensation determination data acquisition section 13 is operable to cause one (e.g., the light-receiving element R [j]) of the light-receiving elements distant from the one (e.g., the light-receiving element R [q]) of the two light-receiving elements adjacent to each other with the distance therebetween across the target boundary line BL, toward an opposite side of the target boundary line BL in the main scanning direction (X direction in the figures), to scan the white determination plate 11 by the plurality of lines in the main scanning direction, or repeatedly scan the white determination plate 11 along the same one line in the main scanning direction, to obtain a plurality of pixel values (e.g., C [j]) of a pixel (e.g., the pixel j) corresponding to the used light-receiving element and acquire an average of the plurality of obtained pixel values (e.g., C [j]) as a new first distant pixel value NVff.

Similarly, in Step S5 (FIG. 6), the second dew-condensation determination data acquisition section 14 is operable to cause a remaining one (e.g., the light-receiving element R [(q+1)]) of the two light-receiving elements adjacent to each other with the distance therebetween across the target boundary line BL to scan the black determination plate 12 by a plurality of lines in the main scanning direction, or repeatedly scan the black determination plate 12 along the same one line in the main scanning direction, to obtain a plurality of pixel values (e.g., C [(q+1)]) of a pixel (e.g., the pixel (q+1)) corresponding to the used light-receiving element and acquire an average of the plurality of obtained pixel values (e.g., C [(q+1)]) as a new second adjacent pixel value NVsn.

Further, the second dew-condensation determination data acquisition section 14 is operable to cause one (e.g., the light-receiving element R [(q+j)]) of the light-receiving elements distant from the remaining one (e.g., the light-receiving element R [q+1]) of the two light-receiving elements adjacent to each other with the distance therebetween across the target boundary line BL, toward an opposite side of the target boundary line BL in the main scanning direction (X direction in the figures), to scan the black determination plate 12 by the plurality of lines in the main scanning direction, or repeatedly scan the black determination plate 12 along the same one line in the main scanning direction, to obtain a plurality of pixel values (e.g., C [(q+j)]) of a pixel (e.g., the pixel (q+j)) corresponding to the used light-receiving element and acquire an average of the plurality of obtained pixel values (e.g., C [(q+j)]) as a new second distant pixel value NVsf.

On the other hand, in the case where the white determination plate 11 and the black determination plate 12 are attached in adjacent relation to each other in the auxiliary scanning direction as illustrated in FIGS. 7 and 8, in Step S4 (FIG. 6), the first dew-condensation determination data acquisition section 13 is operable to cause a plurality of light-receiving elements (e.g., h light-receiving elements R [1] to R [h]) to scan the white determination plate 11 by a plurality of lines (m lines) in the main scanning direction (X direction in the figures) to obtain a plurality of pixel values (e.g., h pixel values C [1] to C [h] (on the m-th line) scanned by the respective light-receiving elements R [1] to R [h]) on one of adjacent two of the plurality of lines located adjacent to each other with a distance G therebetween across the boundary line BL, and acquire an average (e.g., (C [1]+ - - - +C [h])/h) of the plurality of pixel values as the new first adjacent pixel value NVfn.

Further, the first dew-condensation determination data acquisition section 13 is operable to cause the plurality of light-receiving elements (e.g., the h light-receiving elements R [1] to R [h]) to scan the white determination plate 11 by the plurality of lines (m lines) in the main scanning direction (X direction in the figures) to obtain a plurality of pixel values (e.g., h pixel values C [1] to C [h] (on the j-th line) scanned by the respective light-receiving elements R [1] to R [h]) on one of the plurality of lines distant from the one of the two lines located adjacent to each other with the distance G therebetween across the boundary line BL, toward an opposite side of the boundary line BL in the auxiliary scanning line, and acquire an average (e.g., (C [1]+ - - - +C [h])/h) of the plurality of pixel values as the new first distant pixel value NVff.

Similarly, in Step S5 (FIG. 6), the second dew-condensation determination data acquisition section 14 is operable to cause the plurality of light-receiving elements (e.g., the h light-receiving elements R [1] to R [h]) to scan the black determination plate 12 by the plurality of lines (m lines from the (m+1)-th line to the (2*m)-th line) in the main scanning direction (X direction in the figures) to obtain a plurality of pixel values (e.g., h pixel values C [1] to C [h] (on the (m+1)-th line) scanned by the respective light-receiving elements R [1] to R [h]) on a remaining one of the two lines located adjacent to each other with the distance G therebetween across the boundary line BL, and acquire an average (e.g., (C [1]+ - - - +C [h])/h) of the plurality of pixel values as the new second adjacent pixel value NVsn.

Further, the second dew-condensation determination data acquisition section 14 is operable to cause the plurality of light-receiving elements (e.g., the h light-receiving elements R [1] to R [h]) to scan the black determination plate 12 by the plurality of lines (m lines) in the main scanning direction (X direction in the figures) to obtain a plurality of pixel values (e.g., h pixel values C [1] to C [h] (on the (m+j)-th line) scanned by the respective light-receiving elements R [1] to R [h]) on one of the plurality of lines distant from the remaining one of the two lines located adjacent to each other with the distance G therebetween across the boundary line BL, toward an opposite side of the boundary line BL in the auxiliary scanning line, and acquire an average (e.g., (C [1]+ - - - +C [h])/h) of the plurality of pixel values as the new second distant pixel value NVsf.

Alternatively, the first dew-condensation determination data acquisition section 13 may be configured to cause a specific one (e.g., the light-receiving element R [1]) of the light-receiving elements to scan one of the two lines located adjacent to each other with the distance G therebetween across the boundary line BL, plural times (e.g., scan the m-th line h times) to obtain a plurality of pixel values (e.g., h pixel values C [1]), and acquire an average of the plurality of pixel values as the new first adjacent pixel value NVfn.

In this case, the first dew-condensation determination data acquisition section 13 may be configured to cause the specific light-receiving element (e.g., the light-receiving element R [1]) to scan one of the plurality of lines distant from the one of the two lines located adjacent to each other with the distance G therebetween across the boundary line BL, toward an opposite side of the boundary line BL in the auxiliary scanning direction, plural times (e.g., scan the j-th line h times) to obtain a plurality of pixel values (e.g., h pixel values C [1]), and acquire an average of the plurality of pixel values as the new first distant pixel value NVff.

Similarly, the second dew-condensation determination data acquisition section 14 may be configured to cause the specific light-receiving element (e.g., the light-receiving element R [1]) to scan a remaining one of the two lines located adjacent to each other with the distance G therebetween across the boundary line BL, plural times (e.g., scan the (m+1)-th line h times) to obtain a plurality of pixel values (e.g., h pixel values C [1]), and acquire an average of the plurality of pixel values as the new second adjacent pixel value NVsn.

In this case, the second dew-condensation determination data acquisition section 14 may be configured to cause the specific light-receiving element (e.g., the light-receiving element R [1]) to scan one of the plurality of lines distant from the remaining one of the two lines located adjacent to each other with the distance G therebetween across the boundary line BL, toward an opposite side of the boundary line BL in the auxiliary scanning direction, plural times (e.g., scan the (m+j)-th line h times) to obtain a plurality of pixel values (e.g., h pixel values C [1]), and acquire an average of the plurality of pixel values as the new second distant pixel value NVsf.

In the third embodiment configured as above, in Step S6 (FIG. 6), the inter-adjacent pixel difference value calculation section 15 is operable to calculate an inter-adjacent pixel difference value Dn, using the new first adjacent pixel value NVfn and the new second adjacent pixel value NVsn acquired in Step S4 and Step S5, as respective ones of the first adjacent pixel value Vfn and the second adjacent pixel value Vsn.

Further, in Step S7 (FIG. 6), the inter-distant pixel difference value calculation section 16 is operable to calculate an inter-distant pixel difference value Df, using the new first distant pixel value NVff and the new second distant pixel value NVsf acquired in Step S4 and Step S5, as respective ones of the first distant pixel value Vff and the second distant pixel value Vsf.

As above, in the third embodiment, the new first adjacent pixel value NVfn is derived as an average of a plurality of pixel values obtained by scanning the white determination plate 11 at a position adjacent to the boundary line between the white determination plate 11 and the black determination plate 12, using the CCD 229. This makes it possible to reduce scanning error of the CCD 229 to produce the first adjacent pixel value Vfn with a high degree of accuracy. In the same manner, based on a reduction in scanning error of the CCD 229, it becomes possible to produce the second adjacent pixel value Vsn, the first distant pixel value Vff and the second distant pixel value Vsf, with a high degree of accuracy.

Then, each of the inter-adjacent pixel difference value Dn and the inter-distant pixel difference value Df can be accurately calculated using the accurate first distant pixel value Vff, second adjacent pixel value Vsn, first distant pixel value Vff and second distant pixel value Vsf. Consequently, the presence or absence of the occurrence of dew condensation can be accurately determined using the accurately calculated inter-adjacent pixel difference value Dn and inter-distant pixel difference value Df.

Although the above embodiments have been described by taking a black and white complex machine as one example of the image forming apparatus of the present disclosure, this description is not meant to be construed in a limiting sense, but the image forming apparatus of the present disclosure may be a color complex machine, or a printer, copier, scanner apparatus or facsimile machine equipped with the image scanner of the present disclosure.

For example, in each of the first to third embodiments, the complex machine 1 may be simplified by omitting the shading correction section 217. Further, in this connection, the processing in Step S10 and Step S12 in FIG. 6 may be eliminated to simplify the configuration.

In the case where the white determination plate 11 and the black determination plate 12 are arranged as illustrated in FIG. 3, it is preferable that each of the first distant pixel ff and the second distant pixel sf is a central one of the plurality of pixels in the main scanning direction, in a respective one of the images of the white determination plate 11 and the black determination plate 12. On the other hand, in the case where the white determination plate 11 and the black determination plate 12 are arranged as illustrated in FIG. 7, it is preferable that each of the first distant pixel ff and the second distant pixel sf is a pixel on a central one of the plurality of lines in the auxiliary scanning direction (a central one of the plurality of pixels in the auxiliary scanning direction), in a respective one of the images of the white determination plate 11 and the black determination plate 12.

The central pixel in the main or auxiliary scanning direction, in each of the images of the white determination plate 11 and the black determination plate 12, is considered as a pixel located away from a boundary line between the installation region of the white determination plate 11 and the black determination plate 12, and the contact glass 221, and the boundary line BL between the white determination plate 11 and the black determination plate 12.

Thus, when each of the first distant pixel ff and the second distant pixel sf is a central one of the plurality of pixels in the main or auxiliary scanning direction, in a respective one of the images of the white determination plate 11 and the black determination plate 12, the inter-distant pixel difference value Df can be accurately calculated using a pixel value of a pixel which is considered to be away from each of the first distant pixel ff and the second distant pixel sf. This makes it possible to accurately determine the presence or absence of the occurrence of dew condensation using the accurately calculated inter-distant pixel difference value Df.

Further, in place of the white determination plate 11 and the black determination plate 12, two or more dew-condensation determination plates each having a non-white and non-black color and a different reflectance may be attached to the contact glass 221. However, when the white determination plate 11 and the black determination plate 12 are used, each of the inter-adjacent pixel difference value Dn and the inter-distant pixel difference value Df becomes larger as compared to the case where each of the dew-condensation determination plates has a non-white and non-black color. This makes it possible to accurately calculate a difference between the inter-adjacent pixel difference value Dn and the inter-distant pixel difference value Df, and thereby accurately determine the presence or absence of the occurrence of dew condensation.

It is to be understood that the present disclosure is not limited to the above embodiments, but various changes and modifications may be made therein. Although the configurations and processes illustrated in FIGS. 1 to 8 are shown by way of specific embodiments of the present disclosure only, they are not meant to limit the present disclosure to the specific embodiments.

EXPLANATION OF CODES

1: complex machine (image forming apparatus)
11: white determination plate (first dew-condensation determination member)
12: black determination plate (second dew-condensation determination member)
13: first dew-condensation determination data acquisition section
14: second dew-condensation determination data acquisition section
15: inter-adjacent pixel difference value calculation section
16: inter-distant pixel difference value calculation section
17: dew-condensation determination section
2: image scanner
214: scanning control section
22: scanner section
221: contact glass (transparent member)
222: light source
229: CCD (image scanning section)
40: recording section (image forming section)
C [1] to C [h]: pixel value
R [1] to R [h]: light-receiving element (pixel detecting element)
Dn: inter-adjacent pixel difference value
Df: inter-distant pixel difference value
ff: first distant pixel
sf: second adjacent pixel
fn: first adjacent pixel
sn: second adjacent pixel
Vff: first distant pixel value
Vsf: second distant pixel value
Vfn: first adjacent pixel value
Vsn: second adjacent pixel value
PS: image scanning position (start position of document image scanning)

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image scanner comprising:
a plate-shaped transparent member for placing a document thereon;
a light source for irradiating a document with light through the transparent member;
an image scanning section having a plurality of pixel detecting elements for scanning an image of the document irradiated with light from the light source, in the form of a plurality of pixels each having brightness represented by a pixel value;
a first dew-condensation determination member and a second dew-condensation determination member provided on a part of the transparent member in adjacent relation to each other in one of a main scanning direction and an auxiliary scanning direction, the first and second dew-condensation determination members being different from each other in terms of light reflectance;
a first dew-condensation determination data acquisition section operable to perform a first dew-condensation determination data acquisition processing for acquiring a first adjacent pixel value and a first distant pixel value, in such a manner that it causes the image scanning section to scan the first dew-condensation determination member at a position adjacent to a boundary line between the first dew-condensation determination member and the second dew-condensation determination member to obtain a pixel as a first adjacent pixel and acquire a pixel value of the first adjacent pixel as the first adjacent pixel value, and further causes the image scanning section to scan the first dew-condensation determination member at a position distant from the boundary line with respect to the first adjacent pixel to obtain a pixel as a first distant pixel and acquire a pixel value of the first distant pixel as the first distant pixel value;

a second dew-condensation determination data acquisition section operable to perform a second dew-condensation determination data acquisition processing for acquiring a second adjacent pixel value and a second distant pixel value, in such a manner that it causes the image scanning section to scan the second dew-condensation determination member at a position adjacent to the boundary line to obtain a pixel as a second adjacent pixel and acquire a pixel value of the second adjacent pixel as the second adjacent pixel value, and further causes the image scanning section to scan the second dew-condensation determination member at a position distant from the boundary line with respect to the second adjacent pixel to obtain a pixel as a second distant pixel and acquire a pixel value of the second distant pixel as the second distant pixel value;

an inter-adjacent pixel difference value calculation section operable to calculate a difference between the first adjacent pixel value and the second adjacent pixel value, as an inter-adjacent pixel difference value;

an inter-distant pixel difference value calculation section operable to calculate a difference between the first distant pixel value and the second distant pixel value, as an inter-distant pixel difference value; and a dew-condensation determination section operable, when evaluation information indicative of a level of a difference between the inter-adjacent pixel difference value and the inter-distant pixel difference value shows that the difference between the inter-adjacent pixel difference value and the inter-distant pixel difference value is greater than a predetermined difference level, to determine that dew condensation occurs around the boundary line on the transparent member.

2. The image scanner as defined in claim 1, wherein the evaluation information is represented as a ratio which is a result of dividing the inter-distant pixel difference value by the inter-adjacent pixel difference value.

3. The image scanner as defined in claim 2, wherein:
the first dew-condensation determination data acquisition section is operable, in the first dew-condensation determination data acquisition processing, to cause the image scanning section to scan the first dew-condensation determination member at a position adjacent to the boundary line between the first and second dew-condensation determination members to obtain a plurality of pixel values and calculate an average of the plurality of pixel values as a new first adjacent pixel value, and to cause the image scanning section to scan the first dew-condensation determination member at a position distant from the boundary line with respect to the position adjacent to the boundary line to obtain a plurality of pixel values and calculate an average of the plurality of pixel values as a new first distant pixel value;

the second dew-condensation determination data acquisition section is operable, in the second dew-condensation determination data acquisition processing, to cause the image scanning section to scan the second dew-condensation determination member at a position adjacent to the boundary line between the first and second dew-condensation determination members to obtain a plurality of pixel values and calculate an average of the plurality of pixel values as a new second adjacent pixel value, and to cause the image scanning section to scan the second dew-condensation determination member at a position distant from the boundary line with respect to the position adjacent to the boundary line to obtain a plurality of pixel values and calculate an average of the plurality of pixel values as a new second distant pixel value;

the inter-adjacent pixel difference value calculation section is operable to calculate the inter-adjacent pixel difference value by using the new first adjacent pixel value and the new second adjacent pixel value as respective ones of the first adjacent pixel value and the second adjacent pixel value; and the inter-distant pixel difference value calculation section is operable to calculate the inter-distant pixel difference value by using the new first distant pixel value and the new second distant pixel value as respective ones of the first distant pixel value and the second distant pixel value.

4. The image scanner as defined in claim 3, which further comprises a scanning control section operable to cause the image processing section to scan an image of a document in increments of one line in a main scanning direction (X-X), while relatively moving the image processing section with respect to the document in an auxiliary scanning direction (Y-Y), wherein:
each of the first dew-condensation determination member and the second dew-condensation determination member is disposed on the transparent member at a position offset in a direction opposite to a direction along which the image scanning section is moved according to the scanning control section, with respect to a position of the transparent member where the scanning of the document image is started; and the scanning control section is operable, before causing the image scanning section to scan the document image, to cause the dew-condensation determination section to perform the determination.

5. The image scanner as defined in claim 2, which further comprises a scanning control section operable to cause the image processing section to scan an image of a document in increments of one line in a main scanning direction (X-X), while relatively moving the image processing section with respect to the document in an auxiliary scanning direction (Y-Y), wherein:
each of the first dew-condensation determination member and the second dew-condensation determination member is disposed on the transparent member at a position offset in a direction opposite to a direction along which the image scanning section is moved according to the scanning control section, with respect to a position of the transparent member where the scanning of the document image is started; and the scanning control section is operable, before causing the image scanning section to scan the document image, to cause the dew-condensation determination section to perform the determination.

6. The image scanner as defined in claim 1, wherein:
the first dew-condensation determination data acquisition section is operable, in the first dew-condensation determination data acquisition processing, to cause the image scanning section to scan the first dew-condensation determination member at a position adjacent to the boundary line between the first and second dew-condensation determination members to obtain a plurality of pixel values and calculate an average of the plurality of pixel values as a new first adjacent pixel value, and to cause the image scanning section to scan the first dew-condensation determination member at a position distant from the boundary line with respect to the position adjacent to the boundary line to obtain a plurality of pixel values and calculate an average of the plurality of pixel values as a new first distant pixel value;

the second dew-condensation determination data acquisition section is operable, in the second dew-condensation determination data acquisition processing, to cause the image scanning section to scan the second dew-condensation determination member at a position adjacent to the boundary line between the first and second dew-condensation determination members to obtain a plurality of pixel values and calculate an average of the plurality of pixel values as a new second adjacent pixel value, and to cause the image scanning section to scan the second dew-condensation determination member at a position distant from the boundary line with respect to the position adjacent to the boundary line to obtain a plurality of pixel values and calculate an average of the plurality of pixel values as a new second distant pixel value;

the inter-adjacent pixel difference value calculation section is operable to calculate the inter-adjacent pixel difference value by using the new first adjacent pixel value and the new second adjacent pixel value as respective ones of the first adjacent pixel value and the second adjacent pixel value; and the inter-distant pixel difference value calculation section is operable to calculate the inter-distant pixel difference value by using the new first distant pixel value and the new second distant pixel value as respective ones of the first distant pixel value and the second distant pixel value.

7. The image scanner as defined in claim 6, which further comprises a scanning control section operable to cause the image processing section to scan an image of a document in increments of one line in a main scanning direction (X-X), while relatively moving the image processing section with respect to the document in an auxiliary scanning direction (Y-Y), wherein:

each of the first dew-condensation determination member and the second dew-condensation determination member is disposed on the transparent member at a position offset in a direction opposite to a direction along which the image scanning section is moved according to the scanning control section, with respect to a position of the transparent member where the scanning of the document image is started; and the scanning control section is operable, before causing the image scanning section to scan the document image, to cause the dew-condensation determination section to perform the determination.

8. The image scanner as defined in claim 1, wherein each of the first distant pixel and the second distant pixel is a central one of the plurality of pixels in a respective one of the images of the first dew-condensation determination member and the second dew-condensation determination member.

9. The image scanner as defined in claim 8, which further comprises a scanning control section operable to cause the image processing section to scan an image of a document in increments of one line in a main scanning direction (X-X), while relatively moving the image processing section with respect to the document in an auxiliary scanning direction (Y-Y), wherein:

each of the first dew-condensation determination member and the second dew-condensation determination member is disposed on the transparent member at a position offset in a direction opposite to a direction along which the image scanning section is moved according to the scanning control section, with respect to a position of the transparent member where the scanning of the document image is started; and the scanning control section is operable, before causing the image scanning section to scan the document image, to cause the dew-condensation determination section to perform the determination.

10. The image scanner as defined in claim 1, which further comprises a scanning control section operable to cause the image processing section to scan an image of a document in increments of one line in a main scanning direction (X-X), while relatively moving the image processing section with respect to the document in an auxiliary scanning direction (Y-Y), wherein:

each of the first dew-condensation determination member and the second dew-condensation determination member is disposed on the transparent member at a position offset in a direction opposite to a direction along which the image scanning section is moved according to the scanning control section, with respect to a position of the transparent member where the scanning of the document image is started; and the scanning control section is operable, before causing the image scanning section to scan the document image, to cause the dew-condensation determination section to perform the determination.

11. The image scanner as defined in claim 1, wherein the first dew-condensation determination member is one of black and white in color, and the second dew-condensation determination member is a remaining one of black and white in color, which is different from that of the first dew-condensation determination member.

12. An image forming apparatus comprising the image scanner as defined in claim 1, and an image forming section for performing image forming using data scanned by the image scanning section.

13. A method of determining an occurrence of dew condensation on a transparent member of an image scanner, the image scanner including:

a plate-shaped transparent member for placing a document thereon;

a light source for irradiating a document with light through the transparent member;

an image scanning section having a plurality of pixel detecting elements for scanning an image of the document irradiated with light from the light source, in the form of a plurality of pixels each having brightness represented by a pixel value;

a first dew-condensation determination member and a second dew-condensation determination member provided on a part of the transparent member in adjacent relation to each other in one of a main scanning direction and an auxiliary scanning direction, the first and second dew-condensation determination members being different from each other in terms of light reflectance;

a first dew-condensation determination data acquisition section operable to perform a first dew-condensation determination data acquisition processing for acquiring a first adjacent pixel value and a first distant pixel value, in such a manner that it causes the image scanning section to scan the first dew-condensation determination member at a position adjacent to a boundary line between the first dew-condensation determination member and the second dew-condensation determination member to obtain a pixel as a first adjacent pixel and acquire a pixel value of the first adjacent pixel as the first adjacent pixel value, and further causes the image scanning section to scan the first dew-condensation determination member at a position distant from the boundary line with respect to the first adjacent pixel to obtain a pixel as a first distant pixel and acquire a pixel value of the first distant pixel as the first distant pixel value;

a second dew-condensation determination data acquisition section operable to perform a second dew-condensation determination data acquisition processing for acquiring a second adjacent pixel value and a second distant pixel value, in such a manner that it causes the image scanning section to scan the second dew-condensation determination member at a position adjacent to the boundary line to obtain a pixel as a second adjacent pixel and acquire a pixel value of the second adjacent pixel as the second adjacent pixel value, and further causes the image scanning section to scan the second dew-condensation determination member at a position distant from the boundary line with respect to the second adjacent pixel to obtain a pixel as a second distant pixel and acquire a pixel value of the second distant pixel as the second distant pixel value;

an inter-adjacent pixel difference value calculation section operable to calculate a difference between the first adjacent pixel value and the second adjacent pixel value, as an inter-adjacent pixel difference value; and an inter-distant pixel difference value calculation section operable to calculate a difference between the first distant pixel value and the second distant pixel value, as an inter-distant pixel difference value, the method comprising, when evaluation information indicative of a level of a difference between the inter-adjacent pixel difference value and the inter-distant pixel difference value shows that the difference between the inter-adjacent pixel difference value and the inter-distant pixel difference value is greater than a predetermined difference level, determining that dew condensation occurs around the boundary line on the transparent member.

14. The method as defined in claim 13, wherein the evaluation information is represented as a ratio which is a result of dividing the inter-distant pixel difference value by the inter-adjacent pixel difference value.

15. The method as defined in claim 14, wherein the image scanner further comprises a scanning control section operable to cause the image processing section to scan an image of a document in increments of one line in a main scanning direction (X-X), while relatively moving the image processing section with respect to the document in an auxiliary scanning direction (Y-Y), wherein:

each of the first dew-condensation determination member and the second dew-condensation determination member is disposed on the transparent member at a position offset in a direction opposite to a direction along which the image scanning section is moved according to the scanning control section, with respect to a position of the transparent member where the scanning of the document image is started; and the scanning control section is operable, before causing the image scanning section to scan the document image, to cause the dew-condensation determination section to perform the determination.

16. The method as defined in claim 13, wherein:

the first dew-condensation determination data acquisition section is operable, in the first dew-condensation determination data acquisition processing, to cause the image scanning section to scan the first dew-condensation determination member at a position adjacent to the boundary line between the first and second dew-condensation determination members to obtain a plurality of pixel values and calculate an average of the plurality of pixel values as a new first adjacent pixel value, and to cause the image scanning section to scan the first dew-condensation determination member at a position distant from the boundary line with respect to the position adjacent to the boundary line to obtain a plurality of pixel values and calculate an average of the plurality of pixel values as a new first distant pixel value;

the second dew-condensation determination data acquisition section is operable, in the second dew-condensation determination data acquisition processing, to cause the image scanning section to scan the second dew-condensation determination member at a position adjacent to the boundary line between the first and second dew-condensation determination members to obtain a plurality of pixel values and calculate an average of the plurality of pixel values as a new second adjacent pixel value, and to cause the image scanning section to scan the second dew-condensation determination member at a position distant from the boundary line with respect to the position adjacent to the boundary line to obtain a plurality of pixel values and calculate an average of the plurality of pixel values as a new second distant pixel value;

the inter-adjacent pixel difference value calculation section is operable to calculate the inter-adjacent pixel difference value by using the new first adjacent pixel value and the new second adjacent pixel value as respective ones of the first adjacent pixel value and the second adjacent pixel value; and the inter-distant pixel difference value calculation section is operable to calculate the inter-distant pixel difference value by using the new first distant pixel value and the new second distant pixel value as respective ones of the first distant pixel value and the second distant pixel value.

17. The method as defined in claim 13, wherein each of the first distant pixel and the second distant pixel is a central one of the plurality of pixels in a respective one of the images of the first dew-condensation determination member and the second dew-condensation determination member.

18. The method as defined in claim 13, wherein the image scanner further comprises a scanning control section operable to cause the image processing section to scan an image of a document in increments of one line in a main scanning direction (X-X), while relatively moving the image processing section with respect to the document in an auxiliary scanning direction (Y-Y), wherein:

each of the first dew-condensation determination member and the second dew-condensation determination member is disposed on the transparent member at a position offset in a direction opposite to a direction along which the image scanning section is moved according to the scanning control section, with respect to a position of the transparent member where the scanning of the document image is started; and the scanning control section is operable, before causing the image scanning section to scan the document image, to cause the dew-condensation determination section to perform the determination.

19. The method as defined in claim 13, wherein the first dew-condensation determination member is one of black and white in color, and the second dew-condensation determination member is a remaining one of black and white in color, which is different from that of the first dew-condensation determination member.

\* \* \* \* \*